(12) United States Patent
Binet et al.

(10) Patent No.: US 10,809,719 B2
(45) Date of Patent: Oct. 20, 2020

(54) SYSTEMS AND METHODS OF CONTROLLING AN AUTONOMOUS VEHICLE USING AN ENHANCED TRAJECTORY FOLLOWING CONFIGURATION

(71) Applicant: UATC, LLC, San Francisco, CA (US)

(72) Inventors: Guillaume Binet, Pittsburgh, PA (US); Diana Yanakiev, Birmingham, MI (US); Dillon Collins, Pittsburgh, PA (US); David McAllister Bradley, Pittsburgh, PA (US); Frederic Tschanz, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 162 days.

(21) Appl. No.: 15/689,251

(22) Filed: Aug. 29, 2017

(65) Prior Publication Data

US 2019/0064813 A1 Feb. 28, 2019

(51) Int. Cl.
*B60W 30/00* (2006.01)
*G05D 1/00* (2006.01)
*G05D 1/02* (2020.01)

(52) U.S. Cl.
CPC ......... *G05D 1/0088* (2013.01); *B60W 30/00* (2013.01); *G05D 1/0061* (2013.01); *G05D 1/0212* (2013.01); *B60W 2556/50* (2020.02); *G05D 2201/0213* (2013.01)

(58) Field of Classification Search
CPC .............................. G05D 1/0088; B60D 30/00
See application file for complete search history.

(56) References Cited

U.S. PATENT DOCUMENTS

| | | | |
|---|---|---|---|
| 2017/0277192 A1* | 9/2017 | Gupta | B60W 30/20 |
| 2018/0253424 A1* | 9/2018 | Banerjee | G06F 16/583 |
| 2018/0253621 A1* | 9/2018 | Banerjee | G06F 16/583 |
| 2018/0348767 A1* | 12/2018 | Jafari Tafti | G08G 1/163 |

* cited by examiner

*Primary Examiner* — Jess Whittington
(74) *Attorney, Agent, or Firm* — Dority & Manning, P.A.

(57) ABSTRACT

Systems and methods for controlling an autonomous vehicle are provided. In one example embodiment, a computer-implemented method includes obtaining data representing a first trajectory including one or more states corresponding to a motion path. The method includes determining a second trajectory based at least in part on the first trajectory, the second trajectory including a first state corresponding to the motion path, and one or more secondary states corresponding to the motion path, the one or more secondary states indicating a state of the autonomous vehicle relative to the first state. The method includes determining one or more control signals based at least in part on the second trajectory. The method includes controlling a motion of the autonomous vehicle according to the motion path, based at least in part on the one or more control signals.

5 Claims, 10 Drawing Sheets

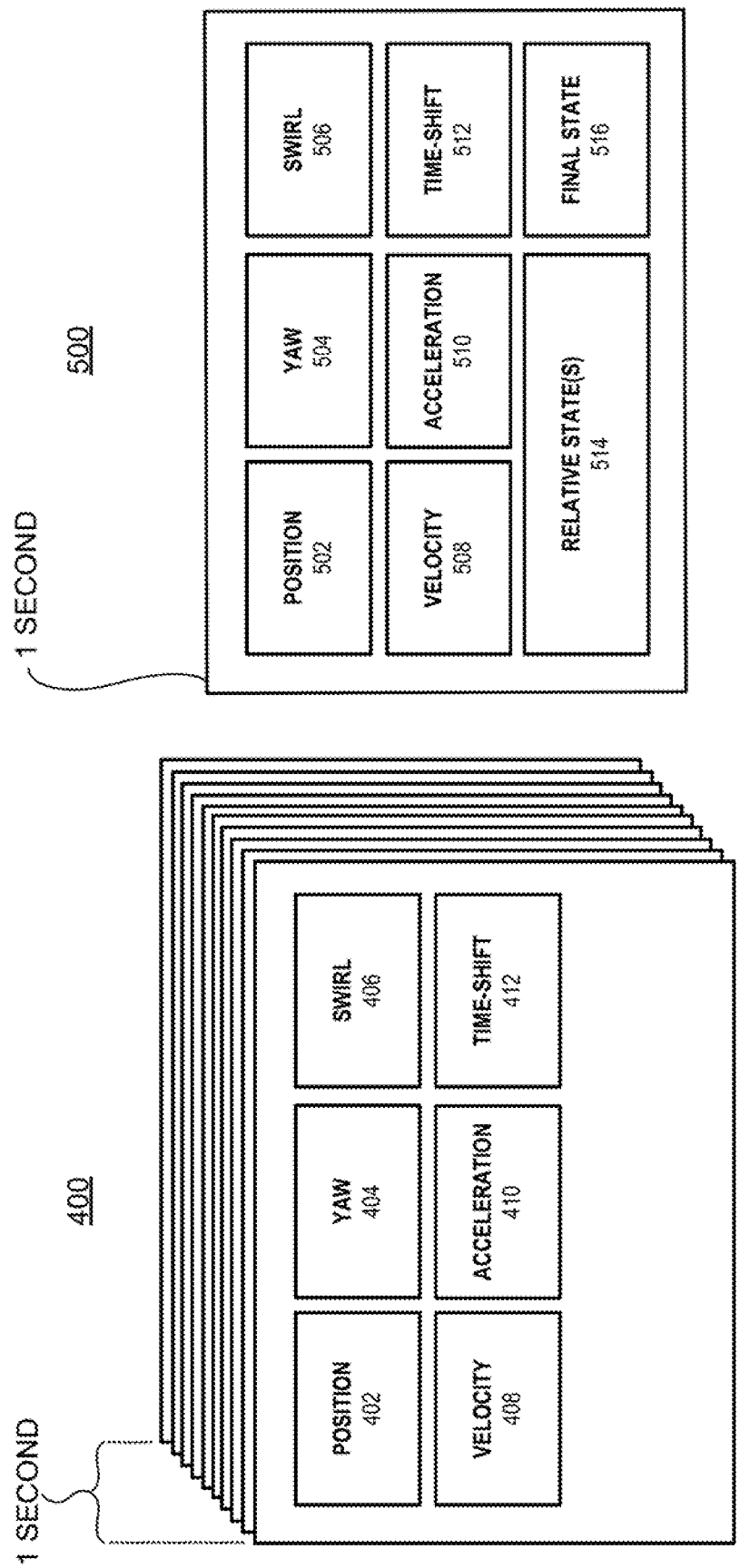
FIG. 5 SIMPLIFIED TRAJECTORY
FIG. 4 NORMAL TRAJECTORY

600

VEHICLE CONTROL SIGNAL(S)

CAN-Frame #1, 8 byte data:
- Signal #1: x_m [m], 0.01 [m] precision
- Signal #2: y_m [m], 0.01 [m] precision
- Signal #3: yaw_rad [rad], 1e-4 [rad] precision CAN-Frame #2, 8 byte data:
- Signal #1: swirl [rad/s], 1e-4 [rad/s] precision
- Signal #2: velocity (longitudinal) [m/s], 2e-3 [m/s] precision
- Signal #3: acceleration (longitudinal) [m/s^2], 6e-4 [m/s^2] precision
- Signal #4: time-shift [ms], 9-bit CAN-Frame #3, 8 byte data:
- Signal #1: jerk, step 0 [m/s^3], 3.125e-6 [m/s^3] precision
- Signal #2: jerk, step 1 [m/s^3], 3.125e-6 [m/s^3] precision
- Signal #3: jerk, step 2 [m/s^3], 3.125e-6 [m/s^3] precision CAN-Frame #4, 8 byte data:
- Signal #1: juke, step 0 [rad/s^2], 2.73e-7 [rad/s^2] precision
- Signal #2: juke, step 1 [rad/s^2], 2.73e-7 [rad/s^2] precision
- Signal #3: juke, step 2 [rad/s^2], 2.73e-7 [rad/s^2] precision CAN-Frame #5, 8 byte data:
- Signal #1: jerk, step 0 [m/s^3], 3.125e-6 [m/s^3] precision
- Signal #2: jerk, step 1 [m/s^3], 3.125e-6 [m/s^3] precision
- Signal #3: jerk, step 2 [m/s^3], 3.125e-6 [m/s^3] precision CAN-Frame #6, 8 byte data:
- Signal #1: juke, step 0 [rad/s^2], 2.73e-7 [rad/s^2] precision
- Signal #2: juke, step 1 [rad/s^2], 2.73e-7 [rad/s^2] precision
- Signal #3: juke, step 2 [rad/s^2], 2.73e-7 [rad/s^2] precision CAN-Frame #7, 8 byte data:
- Signal #1: jerk, step 0 [m/s^3], 3.125e-6 [m/s^3] precision
- Signal #2: jerk, step 1 [m/s^3], 3.125e-6 [m/s^3] precision
- Signal #3: jerk, step 2 [m/s^3], 3.125e-6 [m/s^3] precision CAN-Frame #8, 8 byte data:
- Signal #1: juke, step 0 [rad/s^2], 2.73e-7 [rad/s^2] precision
- Signal #2: juke, step 1 [rad/s^2], 2.73e-7 [rad/s^2] precision
- Signal #3: juke, step 2 [rad/s^2], 2.73e-7 [rad/s^2] precision CAN-Frame #9, 8 byte data:
- Signal #1: dx_m [m], 0.01 [m] precision
- Signal #2: dy_m [m], 0.01 [m] precision
- Signal #3: yaw_end [rad], 1e-4 [rad] precision

FIG. 6

SYSTEMS AND METHODS OF CONTROLLING AN AUTONOMOUS VEHICLE USING AN ENHANCED TRAJECTORY FOLLOWING CONFIGURATION

FIELD

The present disclosure relates generally to controlling an autonomous vehicle using an enhanced trajectory following configuration.

BACKGROUND

An autonomous vehicle is a vehicle that is capable of sensing its environment and navigating without human input. In particular, an autonomous vehicle can determine a motion plan that includes a planned trajectory for controlling a motion of the autonomous vehicle through its environment. The autonomous vehicle can execute the planned trajectory to control the motion of the autonomous vehicle in accordance with the motion plan, by generating one or more corresponding vehicle command(s), and determining one or more vehicle control signal(s) based on the vehicle command(s).

SUMMARY

Aspects and advantages of the present disclosure will be set forth in part in the following description, or may be learned from the description, or may be learned through practice of the embodiments.

One example aspect of the present disclosure is directed to a computer-implemented method for controlling an autonomous vehicle. The method includes obtaining, by a computing system comprising one or more computing devices, data representing a first trajectory of an autonomous vehicle that indicates a motion path between an initial state of the autonomous vehicle and a final state of the autonomous vehicle, the first trajectory including one or more states corresponding to the motion path. The method includes determining, by the computing system, a second trajectory based at least in part on the first trajectory, the second trajectory including a first state corresponding to the motion path, and one or more secondary states corresponding to the motion path, the one or more secondary states indicating a state of the autonomous vehicle relative to the first state. The method includes determining, by the computing system, one or more control signals based at least in part on the second trajectory, wherein the control signals cause the autonomous vehicle to execute at least part of the motion path. The method includes controlling a motion of the autonomous vehicle according to the motion path, based at least in part on the one or more control signals.

Another example aspect of the present disclosure is directed to a computing system for controlling an autonomous vehicle. The computing system includes one or more processors and one or more tangible, non-transitory, computer readable media that collectively store instructions that when executed by the one or more processors cause the computing system to perform operations. The operations include determining a first trajectory of an autonomous vehicle indicating a motion path between an initial state and final state of the autonomous vehicle, the first trajectory including one or more states corresponding to the motion path. The operations include determining a second trajectory based at least in part on the first trajectory, the second trajectory including a first state corresponding to the motion path, and one or more secondary states corresponding to the motion path, the one or more secondary state indicating a state of the autonomous vehicle relative to the first state. The operations include determining one or more control signals based at least in part on the second trajectory, wherein the control signals cause the autonomous vehicle to execute at least part of the motion path. The operations include controlling a motion of the autonomous vehicle according to the motion path, based at least in part on the one or more control signals.

Another example aspect of the present disclosure is directed to a computer-implemented method for controlling an autonomous vehicle. The method includes obtaining, by a computing system comprising one or more computing devices, data representing one or more vehicle commands to be cached. The method includes monitoring, by the computing system, a diagnostics channel of the autonomous vehicle, and detecting one or more faults associated with the autonomous vehicle. The method includes identifying, by the computing system, one or more cached vehicle commands that correspond to the one or more detected faults. The method includes controlling, by the computing system, a motion of the autonomous vehicle, based at least in part on the identified cached vehicle commands.

Yet another example aspect of the present disclosure is directed to a computing system for controlling an autonomous vehicle. The computing system includes one or more processors and one or more tangible, non-transitory, computer readable media that collectively store instructions that when executed by the one or more processors cause the computing system to perform operations. The operations include receiving one or more control signals to control a motion of the autonomous vehicle according to at least part of a motion path of the autonomous vehicle. The operations include analyzing the one or more control signals to determine a data structure corresponding to the one or more control signals. The operations include controlling the motion of the autonomous vehicle based at least in part on the data structure corresponding to the one or more control signals.

Other example aspects of the present disclosure are directed to systems, methods, vehicles, apparatuses, tangible, non-transitory computer-readable media, and memory devices for controlling an autonomous vehicle.

These and other features, aspects, and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

FIG. 4 depicts a data structure for a vehicle command representing a normal trajectory, according to example embodiments of the present disclosure;

FIG. 5 depicts a data structure for a vehicle command representing a simplified trajectory, according to example embodiments of the present disclosure;

FIG. 6 depicts a data structure for vehicle control signals, according to an example embodiments of the present disclosure;

DETAILED DESCRIPTION

Figure 1:
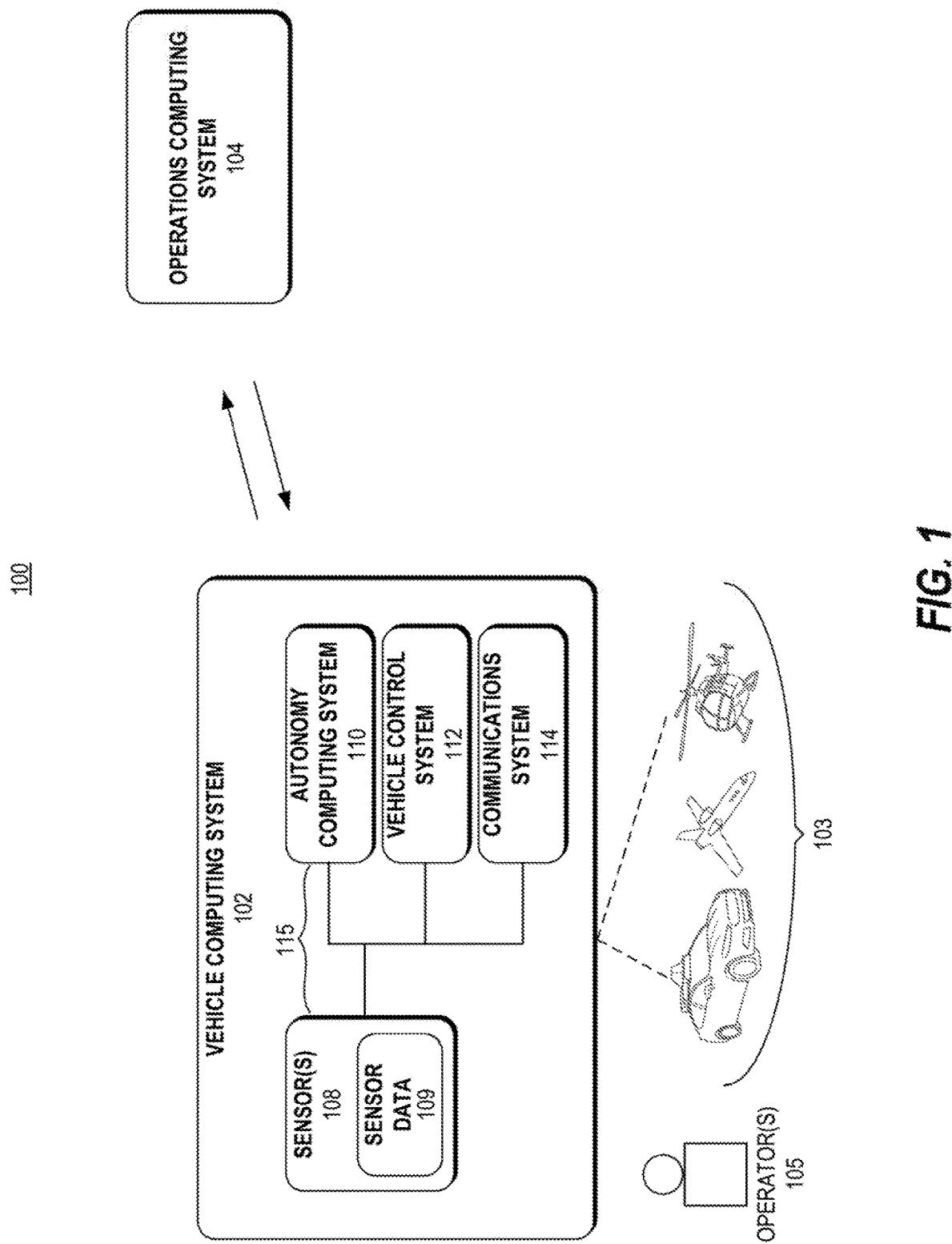
FIG. 1 depicts an example system overview, according to example embodiments of the present disclosure.

Example aspects of the present disclosure are directed to controlling an autonomous vehicle with an enhanced trajectory following configuration. An autonomous vehicle can autonomously navigate to a specified destination by determining a motion plan that includes a planned trajectory.

The planned trajectory can include vehicle state information of the autonomous vehicle at a future time indicated by time-shift information (e.g., time-shift), for a plurality of future times between an initial time and final time. The vehicle state information can include a vehicle position (e.g., one or more coordinates descriptive of vehicle position in a respective dimension) defining, for example, a Euclidean vector, latitude and longitude, and position within local Cartesian reference frames. The vehicle state information can also include a vehicle velocity, acceleration, jerk (e.g., change in acceleration), yaw (e.g., steering angle), swirl (e.g., change in steering angle, or steering velocity), and juke (e.g., change in swirl, or steering acceleration).

In some implementations, the plurality of future times can be determined based on a predetermined time-interval. For example, the plurality of future times can include the initial time, and a time corresponding to each multiple of the predetermined time-interval that is less than the final time. As another example, a planned trajectory can be associated with initial and final times of "0.001 seconds" and "1.101 seconds," respectively, and a predetermined time-interval of "0.010 seconds." In this case, a plurality of future times corresponding to the planned trajectory can include: 0.001, 0.011, 0.021, 0.031, . . . , 0.091 seconds. In some implementations, the plurality of future times can include the final time. As yet another example, a planned trajectory can include vehicle state information of the autonomous vehicle corresponding to 0.001, 0.011, 0.021, 0.031, . . . , and 0.091 seconds in the future.

The autonomous vehicle can identify the trajectory information included in the planned trajectory as normal trajectory information, and determine one or more vehicle command(s) based on the normal trajectory information (e.g., normal trajectory). Each vehicle command can indicate a state of the autonomous vehicle at a particular future time. For example, the autonomous vehicle can generate eleven vehicle commands that indicate eleven sets of vehicle states corresponding to an initial time of 0.001 seconds, final time of 1.101 seconds, and predetermined time-interval of 0.010 seconds (e.g., 0.001, 0.011, 0.021, 0.031, . . . , 0.091, and 1.011). The autonomous vehicle can determine one or more vehicle control signal(s) for each of the eleven vehicle commands to control a motion of the autonomous vehicle in accordance with the motion plan.

The present disclosure enables the autonomous vehicle to determine simplified trajectory information based on a planned trajectory, generate vehicle command(s) based on the simplified trajectory information (e.g., simplified trajectory), and determine vehicle control signal(s) for each vehicle command based on the simplified trajectory information, to control a motion of the autonomous vehicle in accordance with the motion plan.

The present disclosure also enables an enhanced trajectory following configuration of the autonomous vehicle. The enhanced trajectory following configuration enables the autonomous vehicle to be controlled via vehicle command(s) corresponding to normal trajectory information and/or simplified trajectory information.

An autonomous vehicle can include a vehicle computing system that implements a variety of systems on-board the autonomous vehicle (e.g., located on or within the autonomous vehicle) for autonomous navigation. For instance, the vehicle computing system can include a vehicle control system (e.g., for controlling one or more systems responsible for powertrain, steering, braking, etc.), and an autonomy computing system (e.g., for planning and executing autonomous navigation).

A vehicle control system of the autonomous vehicle can include one or more system(s) for controlling the autonomous vehicle in response to receiving one or more vehicle control signal(s). For instance, the vehicle control system can include a powertrain control system, steering control system, braking control system, etc. The vehicle control system can receive one or more vehicle control signal(s) from one or more system(s) on-board the autonomous vehicle. The vehicle control system can instruct one or more actuator(s) respectively associated with the powertrain control system, steering control system, braking control system, etc. to control the autonomous vehicle in accordance with the vehicle control signal(s).

In some implementations, the vehicle control system can include an electronic control unit that can receive one or more vehicle control signal(s), process the vehicle control signal(s) to determine a corresponding trajectory-type (e.g., normal/simplified type), and instruct one or more control system(s) (e.g., powertrain control system, steering control system, braking control system, etc.) to control the autonomous vehicle based on the trajectory-type. For example, the electronic control unit can receive vehicle control signal(s) associated with a motion plan of an autonomous vehicle, and process the vehicle control signal(s) to determine a trajectory-type corresponding to the received vehicle control signal(s). The electronic control unit can determine whether the trajectory-type is a normal trajectory or simplified trajectory. For example, a normal trajectory is indicative of normal trajectory information, and a simplified trajectory is indicative of simplified trajectory information. In some implementations, the electronic control unit can be configured to process the received vehicle control signal(s) at one or more predetermined precision-levels. For example, the electronic control unit can process vehicle control signal(s) at a minimum required precision-level, and/or one or more precision-levels higher than the minimum. The electronic control unit can determine one or more instruction(s) based on the determined trajectory type, and provide the instructions to the control system(s) to control the autonomous vehicle in accordance with the motion plan.

In some implementations, the electronic control unit can include one or more processor(s) and one or more tangible, non-transitory, computer readable media, independent from the vehicle computing system 102. The one or more tangible, non-transitory, computer readable media can store instructions that when executed by the one or more processor(s) cause the electronic control unit to receive and process one or more vehicle control signal(s), and determine one or more instruction(s) to control an autonomous vehicle. In some implementations, the computer readable media can include one or more cached vehicle command(s), such as for example, a soft-stop, hard-stop, or critical-stop vehicle command (e.g., emergency vehicle command(s)). The cached vehicle command(s) can include one or more instruction(s) to instruct one or more other system(s) of the vehicle control system, such as for example, the powertrain control system, steering control system, braking control system, etc., and implement the corresponding emergency vehicle command.

In some implementations, the electronic control unit can include one or more special-purposed hardware to receive and process vehicle control signal(s) to control an autonomous vehicle. The special-purposed hardware can include one or more hard-coded vehicle command(s) (e.g., cached vehicle command(s)) to instruct one or more other system(s) of the vehicle control system, such as for example, the powertrain control system, steering control system, braking control system, etc. The hard-coded vehicle command(s) can correspond to one or more emergency vehicle command(s), such as for example, a soft-stop, hard-stop, or critical-stop vehicle command. In some implementations, the electronic control unit can monitor a diagnostics channel of an autonomous vehicle to detect a fault associated with one or more system(s) on-board the autonomous vehicle. If the electronic control unit detects a fault, then the electronic control unit can automatically instruct the powertrain control system, steering control system, braking control system, etc. to implement a corresponding emergency vehicle command, based on the hard-coded instruction(s).

An autonomy computing system of the autonomous vehicle can include one or more autonomy system(s) for planning and executing autonomous navigation. For instance, an autonomy computing system can include, among other systems, a perception system, a prediction system, and a motion planning system that cooperate to perceive a surrounding environment of an autonomous vehicle and determine a motion plan for controlling a motion of the autonomous vehicle. The motion plan can include a planned trajectory of the autonomous vehicle. Additionally, the autonomy computing system can include, among other system(s), a trajectory following system and a mobility controlling system that cooperate to execute the planned trajectory of the autonomous vehicle, in accordance with the motion plan, and control the motion of the autonomous vehicle. For example, the autonomy computing system can generate one or more vehicle command(s) and determine one or more vehicle control signal(s) based on the planned trajectory, in the manner described herein to implement autonomous navigation.

In some implementations, an autonomous vehicle can generate one or more vehicle command(s) based on a planned trajectory included in a motion plan. A planned trajectory can include one or more vehicle state(s) provided in discrete time intervals over a predetermined timespan p. For example, the planned trajectory $P_1$ can include a plurality of trajectory datapoints between time $t_1$ and $t_p$, where $t_p = t_{p-1} + \text{time\_interval}$ seconds, and $t_p = t_1 + \text{time\_interval} \times (p-1)$ seconds.

TABLE 1

Example Planned Trajectory ($P_1$)

| | | |
|---|---|---|
| $P_1$ | $t_1$ | $x_1, y_1, r_1, s_1, v_1, a_1, t_{shift\_1}$ |
| | $t_2$ | $x_2, y_2, r_2, s_2, v_2, a_2, t_{shift\_2}$ |
| | $t_3$ | $x_3, y_3, r_3, s_3, v_3, a_3, t_{shift\_3}$ |
| | $t_4$ | $x_4, y_4, r_4, s_4, v_4, a_4, t_{shift\_4}$ |
| | $t_5$ | $x_5, y_5, r_5, s_5, v_5, a_5, t_{shift\_5}$ |
| | $t_6$ | $x_6, y_6, r_6, s_6, v_6, a_6, t_{shift\_6}$ |
| | $t_7$ | $x_7, y_7, r_7, s_7, v_7, a_7, t_{shift\_7}$ |
| | $t_8$ | $x_8, y_8, r_8, s_8, v_8, a_8, t_{shift\_8}$ |
| | $t_9$ | $x_9, y_9, r_9, s_9, v_9, a_9, t_{shift\_9}$ |
| | $t_{10}$ | $x_{10}, y_{10}, r_{10}, s_{10}, v_{10}, a_{10}, t_{shift\_10}$ |
| | ... | ... |
| | $t_p$ | $x_p, y_p, r_p, s_p, v_p, a_p, t_{shift\_p}$ |

In some implementations, the autonomous vehicle can identify the trajectory information included in the planned trajectory as normal trajectory information, and the planned trajectory as a normal trajectory. In some implementations, the normal trajectory can include a shorter timespan n (e.g., n<p). For example, the normal trajectory $T_1$ can include one or more vehicle state(s) provided in discrete time intervals over a timespan n, with a time_interval of ten milliseconds (e.g., 0.010 seconds). The normal trajectory $T_1$ can include a plurality of trajectory datapoints between time $t_1$ and $t_n$, where $t_n = t_{n-1} + 0.010$ seconds, and $t_n = t_1 + 0.010*(n-1)$ seconds.

TABLE 2

Example Normal Trajectory ($T_1$)

| | | |
|---|---|---|
| $T_1$ | $t_1$ | $x_1, y_1, r_1, s_1, v_1, a_1, t_{shift\_1}$ |
| | $t_2$ | $x_2, y_2, r_2, s_2, v_2, a_2, t_{shift\_2}$ |
| | $t_3$ | $x_3, y_3, r_3, s_3, v_3, a_3, t_{shift\_3}$ |
| | $t_4$ | $x_4, y_4, r_4, s_4, v_4, a_4, t_{shift\_4}$ |
| | $t_5$ | $x_5, y_5, r_5, s_5, v_5, a_5, t_{shift\_5}$ |
| | $t_6$ | $x_6, y_6, r_6, s_6, v_6, a_6, t_{shift\_6}$ |
| | $t_7$ | $x_7, y_7, r_7, s_7, v_7, a_7, t_{shift\_7}$ |
| | $t_8$ | $x_8, y_8, r_8, s_8, v_8, a_8, t_{shift\_8}$ |
| | $t_9$ | $x_9, y_9, r_9, s_9, v_9, a_9, t_{shift\_9}$ |
| | $t_{10}$ | $x_{10}, y_{10}, r_{10}, s_{10}, v_{10}, a_{10}, t_{shift\_10}$ |
| | ... | ... |
| | $t_n$ | $x_n, y_n, r_n, s_n, v_n, a_n, t_{shift\_n}$ |

In some implementations, a vehicle command can be generated according to a first data structure to indicate normal trajectory information, or a second data structure to indicate simplified trajectory information. In some implementations, the first data structure can be similar to least a part of the second data structure. For example, the first data structure can include a position (e.g., first and second coordinates in a Cartesian reference frame), yaw, swirl, velocity, acceleration, and time-shift, at a time t. As another example, the second data structure can include a position (e.g., first and second coordinates in a Cartesian reference frame), yaw, swirl, velocity, acceleration, and time-shift, at a time t; and relative state information of the autonomous vehicle at one or more future times >t. The autonomous vehicle can generate one or more vehicle control signal(s) based on a vehicle command corresponding to the first data structure and/or the second data structure.

In some implementations, the autonomous vehicle can generate one or more vehicle command(s) that indicate normal trajectory information. Each vehicle command can indicate a state of the autonomous vehicle at a corresponding time. The autonomous vehicle can determine one or more vehicle control signal(s) based on the vehicle command(s), and provide the vehicle control signal(s) to the vehicle control system.

As depicted in Table 2, normal trajectory $T_1$ can include at time $t_1$, an initial position $(x_1, y_1)$, yaw $r_1$, swirl $s_1$, velocity $v_1$, acceleration $a_1$, and time-shift $t_{shift-1}$; at time $t_2$, an intermediate position $(x_2, y_2)$, yaw $r_2$, swirl $s_2$, velocity $v_2$, acceleration $a_2$, and time-shift $t_{shift-2}$; and at time $t_n$, a final position $(x_n, y_n)$, yaw $r_n$, swirl $s_n$, velocity $v_n$, acceleration $a_n$, and time-shift $t_{shift-n}$. The autonomous vehicle can then generate vehicle commands $C_1, C_2, \ldots C_n$, based on $T_1$. As depicted in Table 3, the vehicle command $C_1$ can indicate position $(x_1, y_1)$, yaw $r_1$, swirl $s_1$, velocity $v_1$, acceleration $a_1$, and time-shift $t_{shift\_1}$; the vehicle command $C_2$ can indicate position $(x_2, y_2)$, yaw $r_2$, swirl $s_2$, velocity $v_2$, acceleration $a_2$, and time-shift $t_{shift\_2}$; and the vehicle command $C_n$ can indicate position $(x_n, y_n)$, yaw $r_n$, swirl $s_n$, velocity $v_n$, acceleration $a_n$, and time-shift $t_{shift\_n}$.

TABLE 3

Example Vehicle Commands (C)

| | |
|---|---|
| $C_1$ | $x_1, y_1, r_1, s_1, v_1, a_1, t_{shift\_1}$ |
| $C_2$ | $x_2, y_2, r_2, s_2, v_2, a_2, t_{shift\_2}$ |
| ... | ... |
| $C_n$ | $x_n, y_n, r_n, s_n, v_n, a_n, t_{shift\_n}$ |

The autonomous vehicle can determine one or more vehicle control signal(s) based on the vehicle command $C_1$ to cause the autonomous vehicle to assume the position $(x_1, y_1)$, yaw $r_1$, swirl $s_1$, velocity $v_1$, and acceleration $a_1$ at a future time corresponding to $t_{shift\_1}$. The autonomous vehicle can determine one or more vehicle control signal(s) based on the vehicle command $C_2$ to cause the autonomous vehicle to assume the position $(x_2, y_2)$, yaw $r_2$, swirl $s_2$, velocity $v_2$, and acceleration $a_2$ at a future time corresponding to $t_{shift\_2}$. The autonomous vehicle can determine one or more vehicle control signal(s) based on the vehicle command $C_n$ to cause the autonomous vehicle to assume the position $(x_n, y_n)$, yaw $r_n$, swirl $s_n$, velocity $v_n$, and acceleration $a_n$ at a future time corresponding to $t_{shift\_n}$. In this way, a motion of the autonomous vehicle can be controlled according to a motion plan based on the normal trajectory.

In some implementations, the autonomous vehicle can generate one or more vehicle command(s) that indicate simplified trajectory information. The vehicle command(s) that indicate the simplified trajectory can include a shorter duration, fewer fields, and/or less precision than vehicle command(s) that indicate normal trajectory information. For example, given a planned trajectory $P_1$, the autonomous vehicle can determine a simplified trajectory $T_2$.

TABLE 4

Example Simplified Trajectory ($T_2$)

| | | |
|---|---|---|
| $T_2$ | $t_1$ | $x_1, y_1, r_1, s_1, v_1, a_1, t_{shift\_1}$ |
| | $t_2$ | $\Delta jerk_2, \Delta juke_2$ |
| | $t_3$ | $\Delta jerk_3, \Delta juke_3$ |
| | $t_4$ | $\Delta jerk_4, \Delta juke_4$ |
| | $t_5$ | $\Delta jerk_5, \Delta juke_5$ |
| | $t_6$ | $\Delta jerk_6, \Delta juke_6$ |
| | $t_7$ | $\Delta jerk_7, \Delta juke_7$ |
| | $t_8$ | $\Delta jerk_8, \Delta juke_8$ |
| | $t_9$ | $\Delta jerk_9, \Delta juke_9$ |
| | $t_{10}$ | $x_{10}, y_{10}, r_{10}$ |

As depicted in Table 4, in some implementations the simplified trajectory $T_2$ can include trajectory information over a shorter duration (e.g., adjusting a temporal window). For example, the simplified trajectory $T_2$ can include vehicle state information between $t_1$ and $t_m$, where m<n (e.g., m=0.101 seconds). In some implementations, $T_2$ can include fewer fields. For example, the simplified trajectory $T_2$ can include a subset of vehicle state information at $t_2$ through $t_m$. In some implementations, $T_2$ can include first and second coordinates for vehicle state(s) at $t_1$ and $t_m$, and include relative state(s) for vehicle state(s) between $t_1$ and $t_m$. The relative state(s) can indicate a state relative to the vehicle state at $t_1$. In some implementations, $T_2$ can include information with less precision than $T_1$ (e.g., adjusting a spatial resolution). For example, $T_1$ can include vehicle state information at a precision of $D_1$ decimal places (e.g., $D_{1\text{-}position}$, $D_{1\text{-}yaw}$, $D_{1\text{-}swirl}$, $D_{1\text{-}velocity}$, $D_{1\text{-}acceleration}$); and $T_2$ can include vehicle state information at a precision of $D_2$ decimal places (e.g., $D_{2\text{-}position}$, $D_{2\text{-}yaw}$, $D_{2\text{-}velocity}$, $D_{2\text{-}acceleration}$), where $D_2 < D_1$ respectively.

The autonomous vehicle can determine one or more vehicle command(s) based on the simplified trajectory $T_2$. For example, the autonomous vehicle can generate a vehicle command $S_1$, based on $T_2$. As depicted in Table 5, for an example, when m=0.101, and time_interval=0.010 seconds, the vehicle command $S_1$ can indicate initial position $(x_1, y_1)$, yaw $r_1$, swirl $s_1$, velocity $v_1$, acceleration $a_1$, relative states $(\Delta jerk_2, \Delta juke_2)$ to $(\Delta jerk_9, \Delta juke_9)$, final position $(x_{10}, y_{10})$ and final yaw $r_{10}$.

TABLE 5

Example Vehicle Commands (S)

| | |
|---|---|
| $S_1$ | $x_1, y_1, r_1, s_1, v_1, a_1, t_{shift\_1}$ |
| | $\Delta jerk_2, \Delta juke_2$ |
| | $\Delta jerk_3, \Delta juke_3$ |
| | $\Delta jerk_4, \Delta juke_4$ |
| | $\Delta jerk_5, \Delta juke_5$ |
| | $\Delta jerk_6, \Delta juke_6$ |
| | $\Delta jerk_7, \Delta juke_7$ |
| | $\Delta jerk_8, \Delta juke_8$ |
| | $\Delta jerk_9, \Delta juke_9$ |
| | $x_{10}, y_{10}, r_{10}$ |

The autonomous vehicle can determine one or more vehicle control signal(s) based on the vehicle command $S_1$, and provide the vehicle control signal(s) to the vehicle control system. In this way, a motion of the autonomous vehicle can be controlled according to a motion plan based on the simplified trajectory.

In some implementations, an autonomous vehicle can analyze one or more vehicle control signal(s) to determine if the vehicle control signals indicate a normal trajectory (e.g., vehicle command(s) C) or a simplified trajectory (e.g., vehicle command(s) S). For example, if a vehicle control system receives one or more first vehicle control signal(s) that indicate a first vehicle state followed by one or more second vehicle control signal(s) that indicate a second vehicle state, then the autonomous vehicle can determine that the first vehicle control signal(s) and the second vehicle control signal(s) indicate a normal trajectory. In this case, the vehicle control system can cause the autonomous vehicle to assume the first vehicle state, and subsequently cause the autonomous vehicle to assume the second vehicle state.

As another example, if the vehicle control system receives one or more first vehicle control signal(s) that indicate a first vehicle state followed by one or more second vehicle control signal(s) that indicate one or more relative states(s), then the vehicle control system can determine that the first control signal(s) and the second control signal(s) together indicate a simplified trajectory. In this case, the vehicle control system can cause the autonomous vehicle to assume the first vehicle state as a reference point, and subsequently cause the autonomous vehicle to assume one or more states(s) indicated by the one or more relative states(s).

Systems and methods for controlling an autonomous vehicle using an enhanced trajectory following configuration can have technical effects of making a trajectory-following system of the autonomous vehicle more robust, and improving efficiency. By enabling an autonomous vehicle to determine simplified trajectory information, an amount of storage space and bandwidth required by the autonomous vehicle to implement a motion plan can be reduced. The autonomous vehicle can control a motion of the autonomous vehicle while processing less data in a more efficient manner. This can allow the autonomous vehicle to allocate the freed storage space and bandwidth to improve/implement other aspect(s) of the autonomous vehicle.

Additionally, by enabling an autonomous vehicle to generate vehicle commands such that a data structure of a first part of a simplified trajectory is similar to a data structure of a normal trajectory, the autonomous vehicle can implement a motion plan using a simplified trajectory instead, with minimal modification. This allows the autonomous vehicle to control a motion of the autonomous vehicle using a simplified trajectory and also maintain backward compatibility with one or more system(s) that rely on normal trajectory information to control the autonomous vehicle.

The systems and methods of the present disclosure also provide an improvement to vehicle computing technology, such as autonomous vehicle computing technology. For instance, the systems and methods herein enable the vehicle technology to generate and use a simplified trajectory for executing a current trajectory of the autonomous vehicle. For example, the systems and methods can allow one or more computing device(s) (e.g., of an autonomous computing system) on-board an autonomous vehicle to generate and use a simplified trajectory in a way that improves efficiency and maintains compatibility. As described herein, an autonomous vehicle can be configured to provide data indicative of a simplified trajectory on-board the autonomous vehicle to one or more other system(s) on-board the autonomous vehicle. The computing device(s) can generate the simplified trajectory based on a current trajectory, and control the autonomous vehicle based at least in part on the simplified trajectory.

With reference now to the FIGS., example embodiments of the present disclosure will be discussed in further detail. FIG. 1 depicts an example system 100 according to example embodiments of the present disclosure. The system 100 can include a vehicle computing system 102 associated with a vehicle 103. In some implementations, the system 100 can include one or more remote computing system(s), such as operations computing system 104 that are remote from the vehicle 103. The operations computing system 104 can remotely manage the vehicle 103.

The vehicle 103 incorporating the vehicle computing system 102 can be a ground-based autonomous vehicle (e.g., car, truck, bus), an air-based autonomous vehicle (e.g., airplane, drone, helicopter, or other aircraft), or other types of vehicles (e.g., watercraft). The vehicle 103 can be an autonomous vehicle that can drive, navigate, operate, etc. with minimal and/or no interaction from a human driver. For instance, the vehicle 103 can be configured to operate in a plurality of operating modes. The vehicle 103 can be configured to operate in a fully autonomous (e.g., self-driving) operating mode in which the vehicle 103 can drive and navigate with no input from a user present in the vehicle 103. The vehicle 103 can be configured to operate in a semi-autonomous operating mode in which the vehicle 103 can operate with some input from a user present in the vehicle 103. In some implementations, the vehicle 103 can enter into a manual operating mode in which the vehicle 103 is fully controllable by a user (e.g., human operator) and can be prohibited from performing autonomous navigation (e.g., autonomous driving).

The vehicle computing system 102 can include one or more computing device(s) located on-board the vehicle 103 (e.g., located on and/or within the vehicle 103). The computing device(s) can include various components for performing various operations and functions. For instance, the computing device(s) can include one or more processor(s) and one or more tangible, non-transitory, computer readable media. The one or more tangible, non-transitory, computer readable media can store instructions that when executed by the one or more processor(s) cause the vehicle 103 (e.g., its computing system, one or more processors, etc.) to perform operations and functions, such as those described herein.

As shown in FIG. 1, the vehicle 103 can include one or more sensors 108, autonomy computing system 110, vehicle control system 112, and communications system 114. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The on-board systems can send and/or receive data, messages, signals, etc. amongst one another via the communication channel.

The sensor(s) 108 can be configured to acquire sensor data 109 associated with one or more objects that are proximate to the vehicle 103 (e.g., within a field of view of one or more of the sensor(s) 108). The sensor(s) 108 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 109 can include image data, radar data, LIDAR data, and/or other data acquired by the sensor(s) 108. The object(s) can include, for example, pedestrians, vehicles, bicycles, and/or other objects. The object(s) can be located in front of, to the rear of, and/or to the side of the vehicle 103. The sensor data 109 can be indicative of locations associated with the object(s) within the surrounding environment of the vehicle 103 at one or more times. The sensor(s) 108 can provide the sensor data 109 to the autonomy computing system 110.

Figure 2:
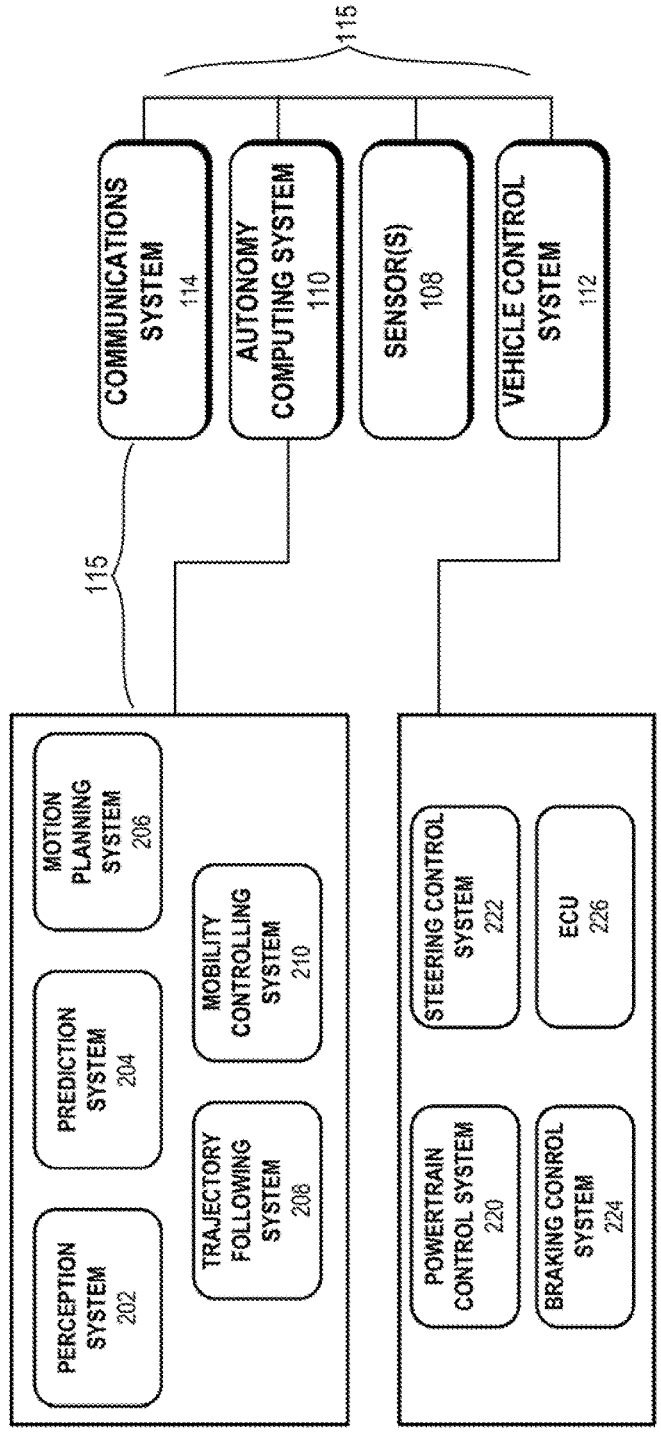
FIG. 2 depicts example system overview, according to example embodiments of the present disclosure.

As shown in FIG. 2, the autonomy computing system 110 can include a perception system 202, prediction system 204, motion planning system 206, trajectory following system 208, mobility controlling system 210, and/or other systems that cooperate to perceive a surrounding environment of the vehicle 103, determine a motion plan for controlling a motion of the vehicle 103 accordingly, and implement the motion plan to control a motion of the vehicle 103. For example, the autonomy computing system 110 can receive the sensor data 109 from the sensor(s) 108, attempt to comprehend the surrounding environment by performing various processing techniques on the sensor data 109 (and/or other data), and generate an appropriate motion plan through such surrounding environment. The autonomy computing system 110 can control the one or more vehicle control system(s) 112 (e.g., powertrain control system 220, steering control system 222, braking control system 224, electronic computing unit (ECU) 226, etc.) and operate the vehicle 103 according to the motion plan.

The autonomy computing system 110 can identify one or more objects that are proximate to the vehicle 103 based at least in part on the sensor data 109. For example, the perception system 202 can obtain perception data descriptive of a current state of an object that is proximate to the vehicle 103. The perception data for each object can describe, for example, an estimate of the object's: current location (also referred to as position); current speed (also referred to as velocity); current acceleration; current heading; current yaw; current swirl; size/footprint (e.g., as represented by a bounding polygon); class (e.g., pedestrian class vs. vehicle class vs. bicycle class), and/or other state information. In some implementations, the perception system 202 can determine perception data for each object over a number of iterations. In particular, the perception system 202 can update the perception data for each object at each iteration. Thus, the perception system 202 can detect and track objects (e.g., vehicles, pedestrians, bicycles, and the like) that are proximate to the autonomous vehicle 103 over time. The perception system 202 can provide the perception data to the prediction system 204 (e.g., for predicting the movement of an object).

The prediction system 204 can create predicted data associated with each of the respective one or more objects proximate to the vehicle 103. The predicted data can be indicative of one or more predicted future locations of each respective object. The predicted data can be indicative of a predicted path (e.g., predicted trajectory) of at least one object within the surrounding environment of the vehicle 103. For example, the predicted path (e.g., trajectory) can indicate a path along which the respective object is predicted to travel over time (and/or the speed at which the object is predicted to travel along the predicted path). The prediction system 204 can provide the predicted data associated with the object(s) to the motion planning system 206.

The motion planning system 206 can determine a motion plan for the vehicle 103 based at least in part on the predicted data (and/or other data), and save the motion plan as motion plan data. The motion plan data can include vehicle actions with respect to the objects proximate to the vehicle 103 as well as the predicted movements. For instance, the motion planning system 206 can implement an optimization algorithm that considers cost data associated with a vehicle action as well as other objective functions (e.g., based on speed limits, traffic lights, etc.), if any, to determine optimized variables that make up the motion plan data. By way of example, the motion planning system 206 can determine that the vehicle 103 can perform a certain action (e.g., pass an object) without increasing the potential risk to the vehicle 103 and/or violating any traffic laws (e.g., speed limits, lane boundaries, signage). The motion plan data can include a planned trajectory, speed, acceleration, etc. of the vehicle 103. The motion planning system 206 can provide at least a portion of the motion plan data that indicates one or more vehicle actions, a planned trajectory, and/or other operating parameters to the trajectory following system 208.

Figure 3:
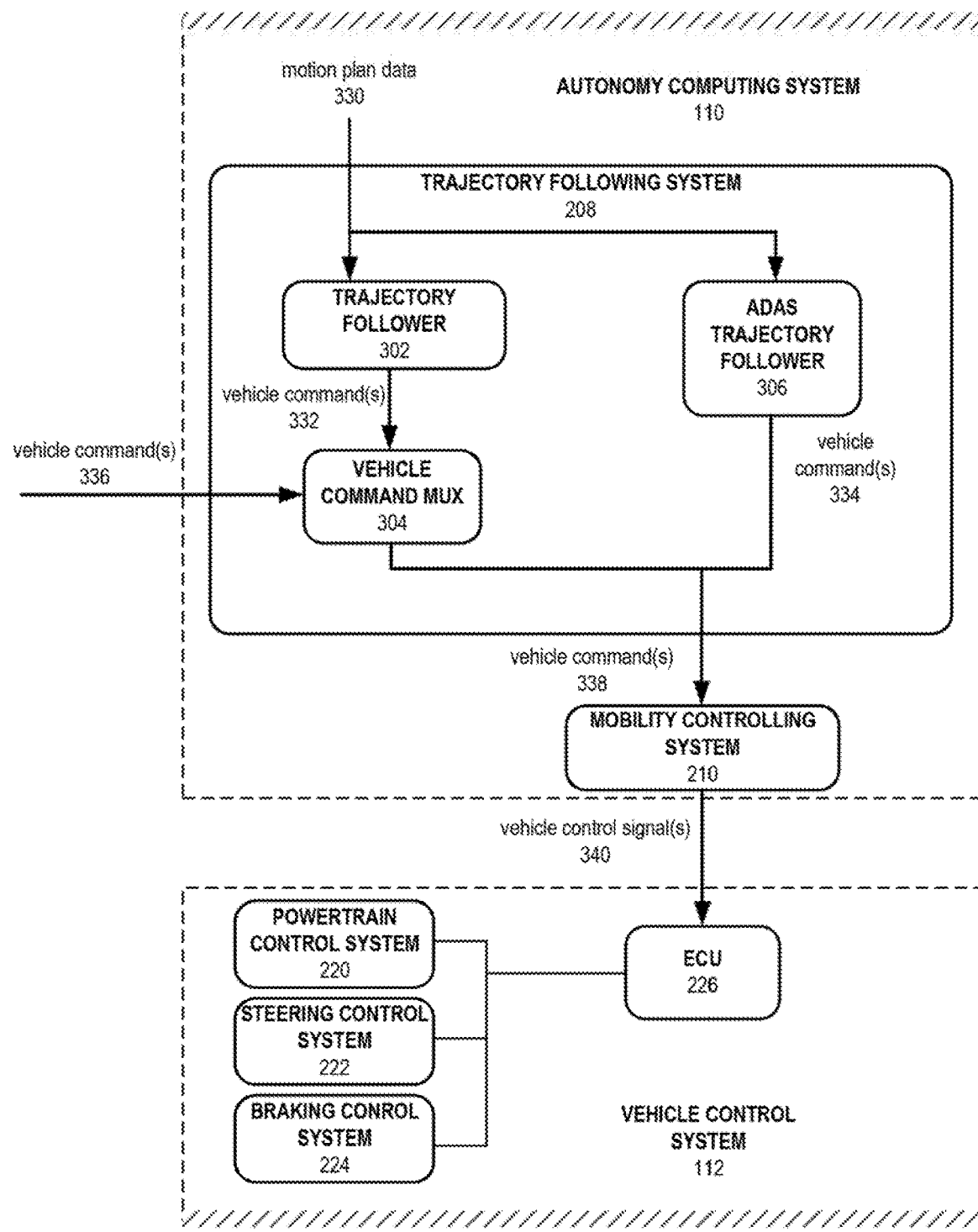
FIG. 3 depicts an overview of an autonomy computing system and vehicle control system, according to example embodiments of the present disclosure.

As shown in FIG. 3, the trajectory following system 208 can generate one or more vehicle control signals(s) based at least in part on the motion plan data (and/or other data). For example, the trajectory follower 302 can receive the motion plan data, and generate one or more vehicle command(s) that correspond to the received motion plan data. The trajectory follower 302 can provide the vehicle command(s) to the vehicle command mux 304. The vehicle command mux 304 can receive one or more vehicle command(s) from the trajectory follower 302 and/or one or more other system(s) on-board the autonomous vehicle, and output the received vehicle command(s) in a sequence determined by the vehicle command mux 304. The vehicle command mux 304 can provide the sequenced vehicle command(s) to the mobility controlling system 210.

In some implementations, the trajectory following system 208 can include the ADAS trajectory follower 306. The ADAS trajectory follower 306 can independently monitor the surrounding environment of the autonomous vehicle as it travels along the planned trajectory, and identify one or more potential collision(s) with one or more object(s) in the surrounding environment. If the ADAS trajectory follower 306 identifies a potential collision, then it can generate one or more vehicle command(s) (e.g., corresponding to an emergency stop) and provide the vehicle command(s) to the mobility controlling system 210, bypassing the vehicle command mux 304.

The mobility controlling system 210 can determine one or more vehicle control signal(s) based at least in part on the vehicle command(s), and provide the vehicle control signal(s) to the vehicle control system 112 to implement the motion plan for the vehicle 103. For instance, the vehicle 103 can include a mobility controlling system that can translate the vehicle command(s) into the vehicle control signal(s). In some implementations, the vehicle control signal(s) correspond to data frames transmitted over a CAN network. For instance, the vehicle 103 can include an autonomy computing system 110 coupled to a vehicle control system 112 over a CAN network. The mobility controlling system 210 can provide the vehicle control signal(s) to the ECU 226 of the vehicle control system 112.

As shown in FIGS. 2 and 3, the vehicle control system 112 can include a powertrain control system 220, steering control system 222, braking control system 224, electronic control unit 226, and/or other systems that cooperate to control a motion of the vehicle 103. For example, the vehicle control system 112 can receive the vehicle control signal(s) from the autonomy computing system 110, analyze the vehicle control signal(s) to identify an appropriate motion of the vehicle 103, and instruct one or more of the control system(s) 220, 222, or 224 to control a motion of the vehicle 103 accordingly. By way of example, the ECU 226 can translate vehicle control signal(s) into instructions to adjust the steering of the vehicle 103 "X" degrees, apply a certain magnitude of braking force, etc.

The communications system 114 can allow the vehicle computing system 102 to communicate with other computing systems (e.g., operations computing system 104). The vehicle computing system 102 can use the communications system 114 to communicate with the operations computing system 104 over one or more networks (e.g., via one or more wireless signal connections). The communications system 114 can include any suitable sub-systems for interfacing with one or more network(s), including, for example, transmitters, receivers, ports, controllers, antennas, and/or other suitable sub-systems that can help facilitate communication.

As shown in FIGS. 4 and 5, the trajectory follower 302 can generate vehicle command(s) 400, 500 based on the motion plan data. For example, the trajectory follower 302 can analyze the motion plan data to determine a planned trajectory for implementing the motion plan. The trajectory follower 302 can determine a normal trajectory or a simplified trajectory based at least in part on the planned trajectory.

The trajectory follower 302 can generate one or more vehicle command(s) corresponding to the normal trajectory or simplified trajectory. The vehicle command 400 corresponds to a vehicle command corresponding to the normal trajectory, and the vehicle command 500 corresponds to a vehicle command corresponding to the simplified trajectory.

As shown in FIG. 4, the vehicle command 400 can be encoded in a data structure that includes data fields for a position 402, yaw 404, swirl 406, velocity 408, acceleration 410, and time-shift 412. The data field time-shift 412 can indicate a future time that that corresponds to the data fields position 402, yaw 404, swirl 406, velocity 408, and acceleration 410. For example, the time-shift 412 can represent ten milliseconds (e.g. 0010 seconds), and the future time can be F(t)=t+time_shift, so that F(t)=t+0.010 seconds (e.g., 10 milliseconds in the future). In this case, the position 402 can represent first and second target coordinates of the vehicle 103 at time F(t); yaw 404 and swirl 406 can represent a target state of the vehicle 103 at time F(t); velocity 408 can represent a target velocity of the vehicle 103 at time F(t); and acceleration 410 can represent a target acceleration of the vehicle 103 at time F(t). Each of the data fields 402-412 can be configured to represent a corresponding value at a corresponding precision. For example, position 402 can represent coordinate values with a precision of four significant figures (e.g. 0.0001 meters); yaw 404 can represent a rotation value with a precision of six significant figures; swirl 406 can represent a rotational velocity value with a precision of six significant figures; velocity 408 with a precision of five significant figures; and acceleration 410 with a precision of six significant figures.

In some implementations, the trajectory follower 302 can determine a normal trajectory based on the planned trajectory, and generate one or more vehicle command(s) 400 based on the normal trajectory. The normal trajectory can include a target position, yaw, swirl, velocity, acceleration, and corresponding time-shift associated with the vehicle 103, for each interval of time in the planned trajectory of the motion plan. For example, given a planned trajectory $P_1$ (see Table 1), the normal trajectory $T_1$ (see Table 2) can include a target position, yaw, swirl, velocity, acceleration, and corresponding time-shift value associated with the vehicle 103, at every 0.010 seconds between time $t_1$ and $t_n$. The trajectory follower 302 can generate a vehicle command 400 for each set of values for each time.

As shown in FIG. 5, the vehicle command 500 can be encoded in a data structure that includes data fields for a position 502, yaw 504, swirl 506, velocity 508, acceleration 510, and time-shift 512. The data field time-shift 412 can indicate a future time that that corresponds to the data fields position 502, yaw 504, swirl 506, velocity 508, and acceleration 510. For example, the time-shift 512 can represent ten milliseconds (e.g., 0.010 seconds), and the future time can be set as F(t)=t+time_shift, so that F(t)=t+0.010 seconds (e.g., 10 milliseconds in the future). In this case, the position 502 can represent first and second target coordinates of the vehicle 103 at time F(t); yaw 504 can represent a target steering angle of the vehicle 103 at time F(t); swirl 506 can represent a target steering velocity of the vehicle 103 at time F(t); velocity 508 can represent a target velocity of the vehicle 103 at time F(t); and acceleration 510 can represent a target acceleration of the vehicle 103 at time F(t). Each of the data fields 502-516 can be configured to represent a corresponding value at a corresponding precision. The corresponding precision for each of the data fields 502-516 can be less precise than the corresponding precision for each of the data fields 402-410 (e.g., adjusting spatial resolution). For example, position 502 can represent coordinate values with a precision of two significant figures (e.g., 0.01 meters); yaw 504 can represent a radian value with a precision of four significant figures; swirl 506 can represent an angular velocity value with a precision of four significant figures; velocity 508 can represent a velocity value with a precision of three significant figures; acceleration 510 can represent an acceleration value with a precision of four significant figures; relative state(s) 514 can represent one or more jerk and juke values with a precision of six significant figures; and final state 516 can represent coordinate values with a precision of two significant figures and a radian value with a precision of four significant figures. In some implementations, the corresponding precision for each of the data fields 502-516 can be set based at least in part on a minimum required precision-level for each of the data fields 502-516 associated with the ECU 226. For example, the corresponding precision for each of the data fields 502-516 can be set to the minimum required precision-level.

In some implementations, the trajectory follower 302 can determine a simplified trajectory based on the planned trajectory, and generate one or more vehicle command(s) 500 based on the normal trajectory. The simplified trajectory can include a target position, yaw, swirl, velocity, acceleration, and time-shift associated with the vehicle 103 at a start-time of a predetermined time-window. The simplified trajectory can further include a target position and yaw associated with the vehicle 103 at an end-time of the predetermined time-window. The simplified trajectory can further include a juke and jerk for each interval of time in the planned trajectory of the motion plan. For example, supposing the planned trajectory $P_1$, a simplified trajectory $T_2$, and a predetermined time-window set to 1 second, while a normal trajectory includes trajectory information spanning between time $t_1$ and $t_n$ seconds, the simplified trajectory includes a fixed time-window of 1 second (e.g., adjusting a temporal window). The simplified trajectory $T_2$ can include a position, yaw, swirl, velocity, acceleration, and time-shift associated with the vehicle 103 at time $t_1$; a target position and yaw associated with the vehicle 103 at time $t_{10}$; and a juke and jerk associated with the vehicle 103 for every 10 millisecond interval between time $t_1$ and $t_{10}$. In some implementations, the position, yaw, swirl, velocity, acceleration, and time-shift associated with the vehicle 103 at time $t_1$ can be determined as a point of origin of the simplified trajectory (e.g., reference point).

The trajectory follower 302 can generate a vehicle command 500 for each simplified trajectory. For example, the trajectory follower 302 can determine position 502 to represent a target position of the vehicle 103 at $t_1$; yaw 504 to represent a target steering angle of the vehicle 103 at $t_1$; swirl 506 to represent a target steering velocity of the vehicle 103 at $t_1$; velocity 508 to represent a target velocity of the vehicle 103 at $t_1$; acceleration 510 to represent a target acceleration of the vehicle 103 at $t_1$; time-shift 512 to represent a time-shift corresponding to the position 502, yaw 504, swirl 506, velocity 508, and acceleration 510; relative state(s) 514 to represent a juke and jerk for each interval of time between $t_1$ and $t_{10}$; and final state 516 to represent a target position and yaw at time $t_{10}$. In this way, instead of generating ten vehicle commands 400 for time $t_1$ to $t_{10}$ seconds based on a normal trajectory, the trajectory follower 302 can generate one vehicle command 500 for time $t_1$ to $t_{10}$ seconds. The trajectory follower 302 can determine another simplified trajectory for $t_{11}$ to $t_{20}$, and another simplified trajectory for $t_{21}$ to $t_{30}$, etc., and generate a corresponding vehicle command for each simplified trajectory.

In some implementations, the trajectory follower 302 can correct for any rounding error resulting from a lower precision of the data fields 502-516, when generating a vehicle command for each simplified trajectory. For example, when the trajectory follower 302 generates a vehicle command 500 for time $t_1$ to $t_{10}$ seconds (e.g., first vehicle command), the trajectory follower 302 can measure a resulting error (e.g. first error). When the trajectory follower 302 generates a vehicle command 500 for time $t_{11}$ to $t_{20}$ seconds (e.g., second vehicle command), the trajectory follower 302 can measure a resulting error (e.g., second error) and adjust the data fields 502-516 of the second vehicle command to correct for the first error. When the trajectory follower 302 generates a vehicle command 500 for time $t_{21}$ to $t_{30}$ seconds (e.g., third vehicle command), the trajectory follower 302 can measure a resulting error (e.g., third error) and adjust the data fields 502-516 of the third vehicle command to correct for the second error. The trajectory follower 302 can repeat this for each subsequent vehicle command 500 to help ensure that the encoding process for simplified trajectories can be done in an error-corrective fashion.

As shown in FIG. 4, the mobility controlling system 210 can receive one or more vehicle command(s) from the trajectory follower 302 (e.g., via vehicle command mux 304). The mobility controlling system 210 can analyze each received vehicle command to determine if the received vehicle command corresponds to a normal trajectory (e.g., vehicle command 400) or a simplified trajectory (e.g., vehicle command 500). For example, the mobility controlling system 210 can analyze a data structure of each received vehicle command to determine if it corresponds to the data structure of vehicle command 400 or the data structure of vehicle command 500. The mobility controlling system 210 can translate each received vehicle command into one or more vehicle control signal(s), based at least in part on the determination of the trajectory-type.

For example, if the mobility controlling system 210 receives a vehicle command 400, the mobility controlling system 210 can translate the vehicle command 400 into a first and second eight-byte CAN frame. The first CAN frame can include the values represented by data fields 402 and 404; and the second CAN frame can include the values represented by data fields 406, 408, 410, and 412. In this way, the mobility controlling system 210 can translate each received vehicle command 400 into two eight-byte CAN frames.

As another example, if the mobility controlling system 210 receives a vehicle command 500, the mobility controlling system 210 can translate the vehicle command 500 into vehicle control signals 600. As shown in FIG. 6, the vehicle control signals 600 include nine eight-byte CAN frames. The first CAN frame can include the values represented by data fields 502 and 504; the second CAN frame can include the values represented by data fields 506, 508, 510, and 512; the third, fifth, and seventh CAN frame can include jerk values represented by the data field 514; the fourth, sixth, and eighth CAN frame can include juke values represented by the data field 514; and the ninth CAN frame can include data represented by the data field 516. In this way, the mobility controlling system 210 can translate each received vehicle command 500 into nine eight-byte CAN frames.

In some implementations, the mobility controlling system 210 can reduce a precision of the values represented by the data fields of a received vehicle command (e.g., adjusting a spatial resolution). For example, the mobility controlling system 210 can tailor the precision of the values to a minimum required precision of one or more other system(s), such as for example, the ECU 226 of the vehicle control system 112. In this way, the mobility controlling system 210 can reduce a bandwidth used to provide vehicle control signal(s) to the ECU 226.

As shown in FIG. 3, the mobility controlling system 210 can provide one or more vehicle control signal(s) to the ECU 226 of the vehicle control system 112. The ECU 226 can receive and analyze the vehicle control signal(s) to determine if the vehicle control signal(s) are indicative of a normal trajectory or a simplified trajectory.

For example, the ECU 226 can analyze the data field values represented by each CAN frame. In this case, if a first CAN frame indicates a position and yaw of the vehicle 103, then the CAN frame can correspond to either a vehicle command 400 (e.g., indicative of normal trajectory) or a vehicle command 500 (e.g., indicative of simplified trajectory); if a second CAN frame indicates a swirl, velocity, acceleration, and time-shift of the vehicle 103, then again the CAN frame can correspond to either a vehicle command 400 or a vehicle command 500. However, if a third CAN frame indicates another position and yaw, then the ECU 226 can determine that the first and second CAN frames are indicative of normal trajectory information. The ECU 226 can then reset the count so that the third CAN frame becomes the first CAN frame. Alternatively, if the third CAN frame indicates one or more state offset(s) (e.g., jerk, juke), then the ECU 226 can determine that the first, second, third, and fourth through ninth CAN frames are indicative of a simplified trajectory information. The ECU can then reset the count so that a tenth CAN frame becomes the first CAN frame.

As another example, the ECU 226 can analyze a precision of the data fields represented by each CAN frame. In this case, if a first CAN frame indicates coordinate values with a precision of four significant figures and a rotation value with a precision of six significant figures, then the ECU can determine that the first and second CAN frames are indicative of normal trajectory information. The ECU 226 can then reset the count so that a third CAN frame becomes the first CAN frame. Alternatively, if the first CAN frame indicates coordinate values with a precision of two significant figures and a rotation value with a precision of four significant figures, then the ECU can determine that the first through ninth CAN frames are indicative of simplified trajectory information. The ECU 226 can then reset the count so that a tenth CAN frame becomes the first CAN frame.

The ECU 226 can identify an appropriate motion of the vehicle 103 based on the determined trajectory-type associated with the received vehicle control signal(s). For example, if the determined trajectory-type is a normal trajectory, then the ECU 226 can instruct one or more of the control system(s) 220, 222, 224 to control a motion of the vehicle 103 accordingly. As another example, if the determined trajectory-type is a simplified trajectory, then the ECU can instruct the control system(s) 220, 222, 224 to control a motion of the vehicle 103 accordingly. In some implementations, the ECU 226 can include hard-coded instruction(s) that correspond to one or more emergency vehicle command(s), such as for example, a soft-stop, hard-stop, or critical-stop vehicle command. The ECU 226 can monitor a diagnostics channel of the vehicle 103, and can identify an anomaly associated with one or more system(s) on-board the vehicle 103. If the ECU 226 detects an anomaly, then the ECU 226 can implement the emergency vehicle command corresponding to the hard-coded instruction(s).

FIGS. 7-10 depict flow diagrams of example methods 700, 800, 900, and 1000, according to example embodiments of the present disclosure. One or more portion(s) of the methods 700, 800, 900, and 1000 can be implemented by one or more computing system(s) such as, for example, the computing system(s) 1101 shown in FIG. 11. Moreover, one or more portion(s) of the methods 700, 800, 900, and 1000 can be implemented as an algorithm on the hardware components of the system(s) described herein (e.g., as in FIGS. 1, 2, 3, and 11) to, for example, determine a normal or simplified trajectory, and enable the vehicle 103 to be controlled with the normal or simplified trajectory. FIGS. 7-10 depict elements performed in a particular order for purposes of illustration and discussion. Those of ordinary skill in the art, using the disclosures provided herein, will understand that the elements of any of the methods (e.g., of FIGS. 7-11) discussed herein can be adapted, rearranged, expanded, omitted, combined, and/or modified in various ways without deviating from the scope of the present disclosure.

Figure 7:
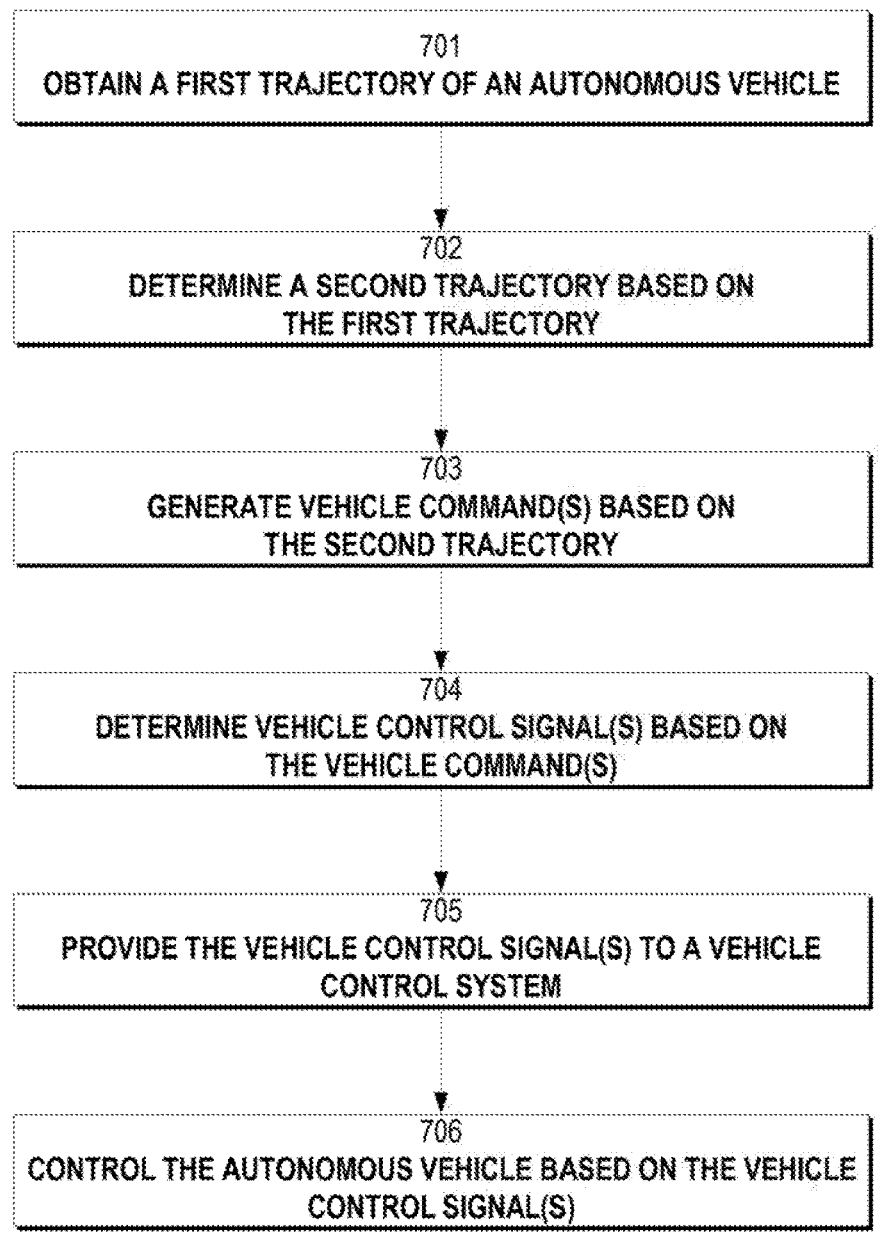
FIG. 7 depicts a flow diagram of controlling an autonomous vehicle using a simplified trajectory, according to example embodiments of the present disclosure.

FIG. 7 depicts a flow diagram of the example method 700 of controlling the vehicle 103 based on simplified trajectory information, according to example embodiments of the present disclosure.

At (701), the method 700 can include obtaining a planned trajectory of an autonomous vehicle. For example, the vehicle 103 can obtain a first trajectory (e.g., planned trajectory) included in a motion plan of the vehicle 103 between an initial state of the vehicle 103 and a final state of the vehicle 103. The first trajectory can indicate one or more states at a respective future time, corresponding to the motion plan (e.g., normal trajectory information).

At (702), the method 700 can include determining a simplified trajectory based on the planned trajectory. For example, the vehicle 103 can determine a second trajectory based at least in part on the first trajectory, the second trajectory including a first state corresponding to the motion plan, and one or more secondary states corresponding to the motion plan, the one or more secondary states indicating a state of the autonomous vehicle relative to the first state; In some implementations, the vehicle 103 can determine a predetermined time-window corresponding to the simplified trajectory, and determine a start and end time corresponding to the predetermined time-window. The second trajectory can include a state and time-offset corresponding to the start time; a state corresponding to the end time; and one or more secondary states (e.g., jerk and juke values) corresponding to one or more time-intervals between the start time and end time. The one or more secondary states can correspond to the motion plan, and indicate a state of the vehicle 103 relative to the state corresponding to the start time.

At (703), the method 700 can include generating one or more vehicle command(s) based on the simplified trajectory. For example, the vehicle 103 can encode the vehicle state in a first data structure that corresponds to the first trajectory (e.g., vehicle command 400), and append the secondary states to the first data structure to generate a second data structure that corresponds to the second trajectory (e.g., vehicle command 500).

At (704), the method 700 can include determining one or more vehicle control signal(s) based on the vehicle command(s). For example, the vehicle 103 can determine one or more vehicle control signal(s) based at least in part on the second trajectory (e.g., based at least in part on the vehicle command(s) 500 that correspond to the second trajectory). The vehicle control signals can cause the vehicle 103 to execute at least part of the motion plan.

At (705), the method 700 can include providing the vehicle control signal(s) to a vehicle control system. For example, the vehicle 103 can provide the vehicle control signal(s) to an ECU 226 that is independent from one or more other system(s) on-board the vehicle 103.

At (706), the method 700 can include controlling the autonomous vehicle based on the vehicle control signal(s). For example, the ECU 226 can receive and process one or more received vehicle control signal(s) to instruct one or more control system(s) 220, 222, 224 and control a motion of the vehicle 103 according to the motion plan.

Figure 8:
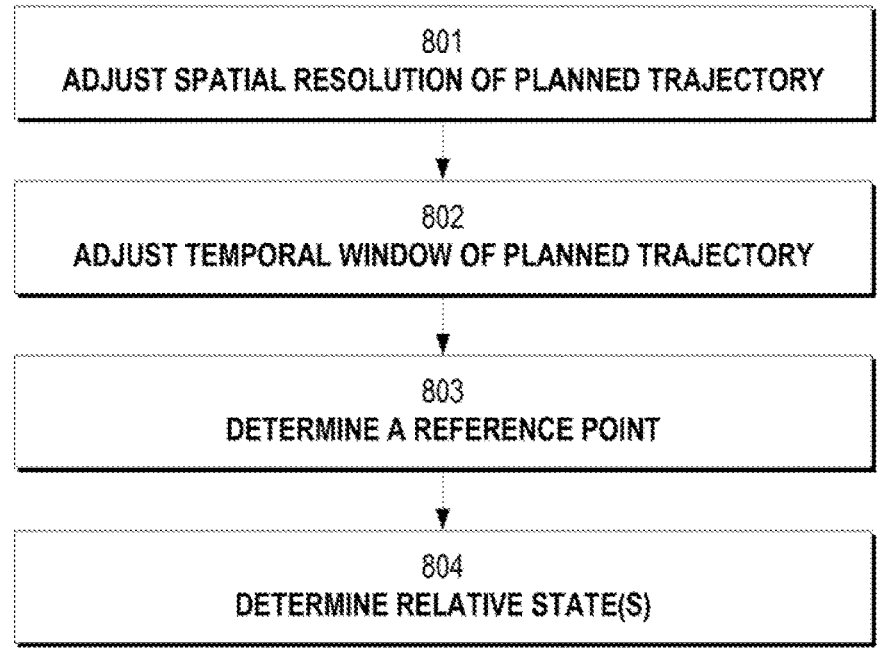
FIG. 8 depicts a flow diagram of determining a simplified trajectory, according to example embodiments of the present disclosure.

FIG. 8 depicts a flow diagram of the example method 800 of determining a simplified trajectory based on a planned trajectory, according to example embodiments of the present disclosure.

At (801), the method 800 can include adjusting a spatial resolution of a planned trajectory. For example, the vehicle 103 can adjust a spatial resolution of the first trajectory from a first spatial resolution to a second spatial resolution that is less precise than the first spatial resolution. The first trajectory can indicate a state of the vehicle 103 with the first spatial resolution, and the second trajectory can indicate a state of the autonomous vehicle with the second spatial resolution.

At (802), the method 800 can include adjusting a temporal window of the planned trajectory. For example, the vehicle 103 can adjust a temporal window of the first trajectory to determine a temporal window for the second trajectory. The first trajectory can indicate a state of the vehicle 103 over a first duration of time, and the second trajectory can indicate a state of the vehicle 103 over a second duration of time that is less than the first duration of time. In some implementations, the temporal window for the second trajectory can be determined based at least in part on a bandwidth available to provide vehicle control signal(s) to the ECU 226, and a minimum precision required by the ECU 226. For example, the bandwidth available can restrict a maximum size for transmitting a single data packet (e.g., CAN frame); and a minimum required precision can limit a minimum number of data packets (e.g., CAN frames) for translating a vehicle command 500.

At (803), the method 800 can include determining a reference point. For example, the second trajectory can include a plurality of datapoints. The plurality of datapoints can include a reference datapoint that corresponds to a state of the vehicle 103 at a start time of the adjusted temporal window. In some implementations, the reference datapoint can include data indicative of a state of the vehicle 103 at the start time. In some implementations, the reference datapoint can include position (e.g., first and second coordinates), yaw, swirl, velocity, acceleration, and time-shift of the vehicle 103 at a time indicated by the time-shift.

At (804), the method 800 can include determining relative states(s). For example, the second trajectory can include a plurality of trajectory datapoints at subsequent times after the start time. The plurality of trajectory datapoints can be defined relative to the reference datapoint. For example, the plurality of trajectory datapoints can include data indicative of a state of the vehicle 103 relative to the state of the vehicle at the start time. In some implementations, the plurality of trajectory datapoints can indicate an offset with respect to the reference datapoint. In some implementations, the plurality of trajectory datapoints can indicate a state of the vehicle 103 in discrete time intervals. In some implementations, the plurality of trajectory datapoints can be an ordered list, a first trajectory datapoint in the ordered list indicating a state of the vehicle 103 with respect to the reference datapoint, and each subsequent trajectory datapoint in the ordered list indicating a state of the vehicle 103 with respect to a preceding trajectory datapoint in the ordered list.

Figure 9:
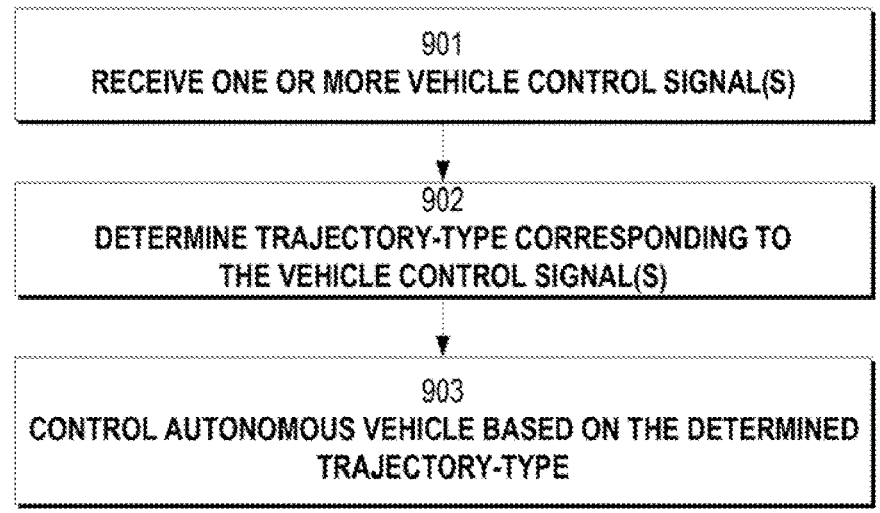
FIG. 9 depicts a flow diagram of controlling an autonomous vehicle using a simplified trajectory, according to example embodiments of the present disclosure.

FIG. 9 depicts a flow diagram of controlling an autonomous vehicle using a simplified trajectory, according to example embodiments of the present disclosure.

At (901), the method 900 can include receiving one or more vehicle control signal(s). For example, the vehicle 103 can provide one or more control signal(s) to an ECU 226 that is independent from the vehicle computing system 102 of the vehicle 103.

At (902), the method 900 can include determining a vehicle command corresponding to the received vehicle control signal(s). For example, the ECU 226 can analyze the one or more control signal(s) to determine a data structure (e.g., vehicle command(s) 400, 500) corresponding to the one or more vehicle control signal(s).

At (903), the method 900 can include controlling an autonomous vehicle based at least in part on the determination. For example, the ECU 22 can control a motion of the autonomous vehicle based at least in part on the determined data structure (e.g., determine one or more instructions to instruct one or more of the control system(s) 220, 222, 224). If the ECU 226 determines that the data structure 400 corresponds to the one or more vehicle control signal(s), then the ECU 226 can control the motion of the vehicle 103 according to the first trajectory. Alternatively, if the ECU 226 determines that the data structure 500 corresponds to the one or more vehicle control signal(s), then the ECU 226 can control the motion of the autonomous vehicle according to the second trajectory.

Figure 10:
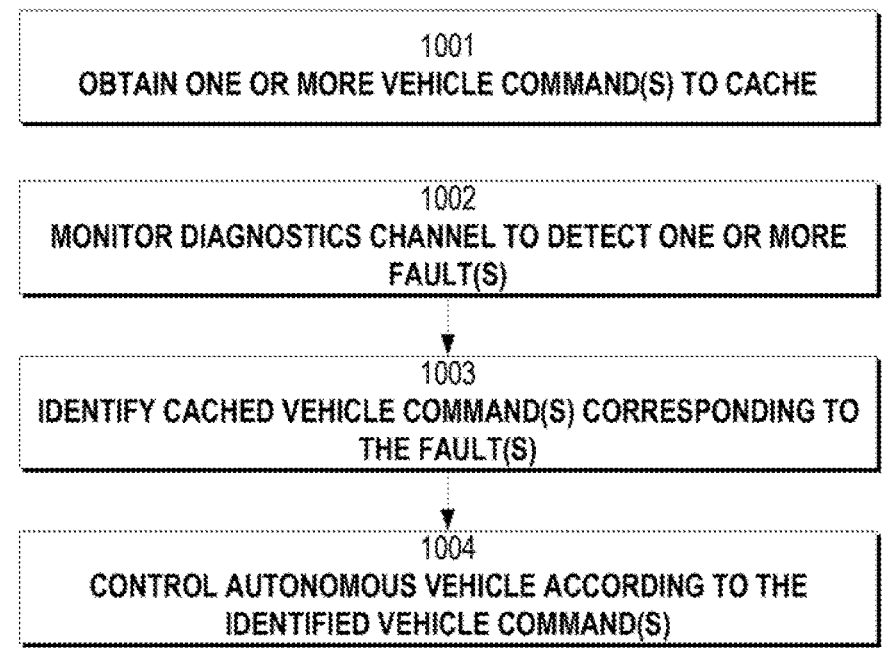
FIG. 10 depicts a flow diagram of controlling an autonomous vehicle in response to a fault associated with the autonomous vehicle, according to example embodiments of the present disclosure.

FIG. 10 depicts a flow diagram of controlling an autonomous vehicle when a fault is detected, according to example embodiments of the present disclosure.

At (1001), the method 1000 can include obtaining one or more vehicle command(s) to cache. The vehicle command(s) can be predetermined vehicle command(s) that are cached in the ECU 226. For example, the vehicle command(s) can be hard-coded in the ECU 226. In some implementations, the vehicle command(s) can be determined based at least in part on an operating mode of the vehicle 103. For example, if the vehicle 103 is operating in a fully autonomous mode, then the vehicle command(s) can include a first set corresponding to the fully autonomous mode. As another example, if the vehicle 103 is operating in a manual mode, then the vehicle command(s) can include a second set corresponding to the manual mode. In some implementations, the vehicle command(s) can include one or more emergency command(s). For example, the vehicle command(s) can include a soft-stop, hard-stop, or critical-stop emergency command. The vehicle command(s) can be cached as data in one or more formats. For example, the vehicle command(s) can be cached as a vehicle command 400, 500; one or more vehicle control signal(s) corresponding to the vehicle command(s); or one or more instruction(s) corresponding to the vehicle control signal(s).

At (1002), the method 1000 can include monitoring a diagnostics channel to detect one or more fault(s) associated with one or more system(s) on-board the autonomous vehicle. In some implementations, the ECU 226 can independently monitor the diagnostics channel. For example, the ECU 226 can periodically check the diagnostics channel for one or more new diagnostic(s) that indicate a fault. In some implementations, one or more system(s) on-board the vehicle 103 can monitor the diagnostics channel (e.g., an autonomy monitoring system) and provide a notification to the ECU 226 when a fault is detected. For example, the vehicle 103 can generate a control signal corresponding to the fault, and provide the control signal to the ECU 226.

At (1003), the method 1000 can include identifying one or more cached vehicle command(s) that correspond to a fault. For example, the ECU 226 can identify one or more vehicle command(s) corresponding to the fault, from the one or more cached vehicle command(s).

At (1004), the method 1000 can include controlling an autonomous vehicle according to the identified vehicle command(s). For example, the vehicle 103 can determine that a cached hard-stop emergency vehicle command corresponds to a detected fault, and instruct one or more control system(s) 220, 222, 224 to control the vehicle 103 in accordance with the hard-stop vehicle command.

Figure 11:
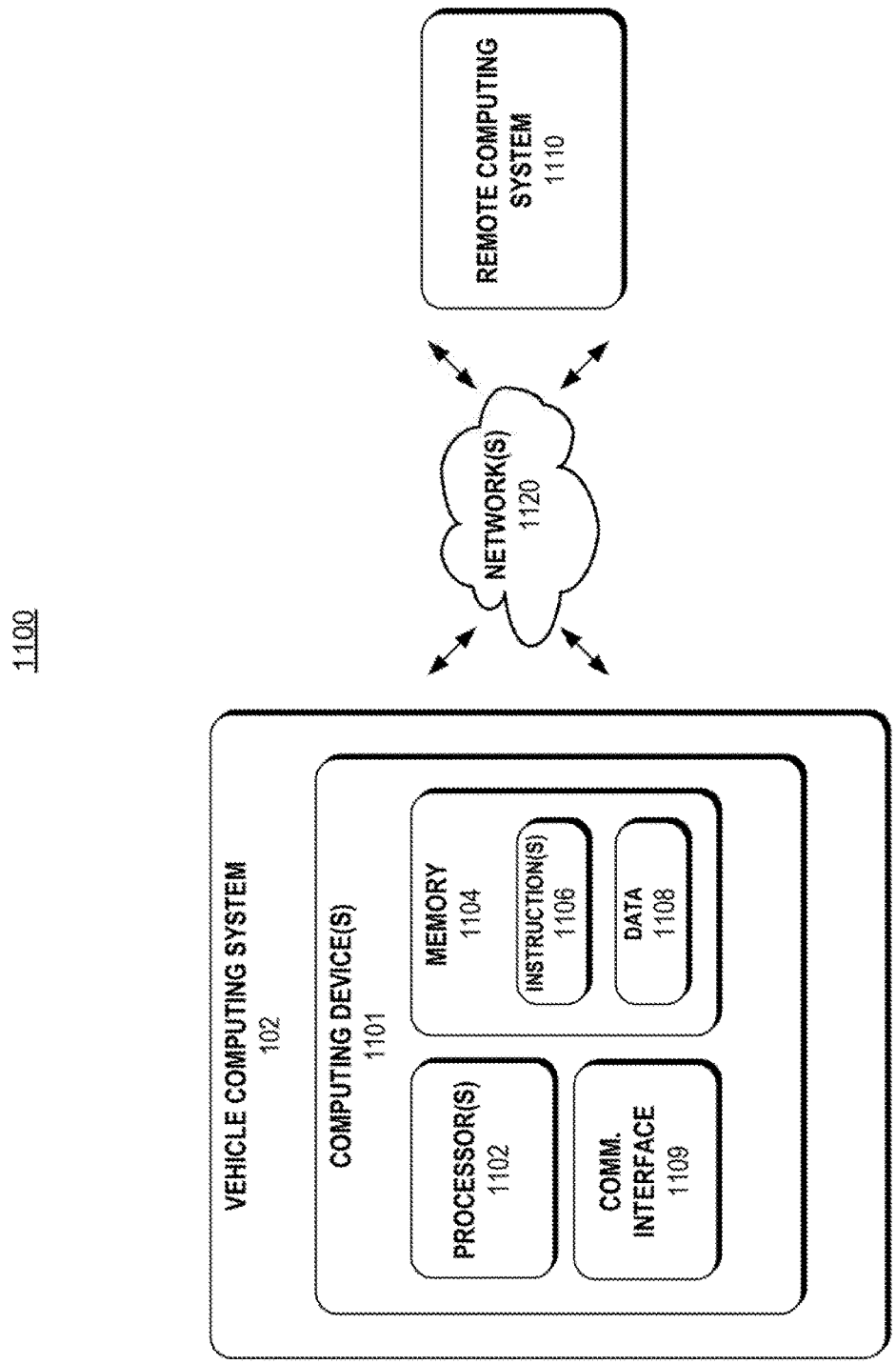
FIG. 11 depicts example system components, according to example embodiments of the present disclosure.

FIG. 11 depicts an example computing system 1100 according to example embodiments of the present disclosure. The example system 1100 illustrated in FIG. 11 is provided as an example only. The components, systems, connections, and/or other aspects illustrated in FIG. 11 are optional and are provided as examples of what is possible, but not required, to implement the present disclosure. The example system 1100 can include the vehicle computing system 102 of the vehicle 103 and, in some implementations, a remote computing system 1110 that is remote from the vehicle 103 (e.g., the operations computing system 104) that can be communicatively coupled to one another over one or more networks 1120. The remote computing system 1110 can be associated with a central operations system and/or an entity associated with the vehicle 103 such as, for example, a vehicle owner, vehicle manager, fleet operator, service provider, etc.

The computing device(s) 1101 of the vehicle computing system 102 can include processor(s) 1102 and a memory 1104. The one or more processors 1102 can be any suitable processing device (e.g., a processor core, a microprocessor, an ASIC, a FPGA, a controller, a microcontroller, etc.) and can be one processor or a plurality of processors that are operatively connected. The memory 1104 can include one or more non-transitory computer-readable storage media, such as RAM, ROM, EEPROM, EPROM, one or more memory devices, flash memory devices, etc., and combinations thereof.

The memory 1104 can store information that can be accessed by the one or more processors 1102. For instance, the memory 1104 (e.g., one or more non-transitory computer-readable storage mediums, memory devices) on-board the vehicle 103 can include computer-readable instructions 1106 that can be executed by the one or more processors 1102. The instructions 1106 can be software written in any suitable programming language or can be implemented in hardware. Additionally, or alternatively, the instructions 1106 can be executed in logically and/or virtually separate threads on processor(s) 1102.

For example, the memory 1104 on-board the vehicle 103 can store instructions 1106 that when executed by the one or more processors 1102 on-board the vehicle 103 cause the one or more processors 1102 (the vehicle computing system 102) to perform operations such as any of the operations and functions of the vehicle computing system 102, as described herein, one or more operations of methods 700, 800, 900, and 1000, and/or any other operations and functions of the vehicle 103, as described herein.

The memory 1104 can store data 1108 that can be obtained, received, accessed, written, manipulated, created, and/or stored. The data 1108 can include, for instance, data associated with perception, prediction, motion plan, (e.g., planned trajectory, normal trajectory, simplified trajectory), vehicle commands, vehicle control signals, control system instructions, and/or other data/information as described herein. In some implementations, the computing device(s) 1101 can obtain data from one or more memory device(s) that are remote from the vehicle 103.

The computing device(s) 1101 can also include a communication interface 1109 used to communicate with one or more other system(s) on-board the vehicle 103 and/or a remote computing device that is remote from the vehicle 103 (e.g., of remote computing system 910). The communication interface 1109 can include any circuits, components, software, etc. for communicating via one or more networks (e.g., 1120). In some implementations, the communication interface 1109 can include, for example, one or more of a communications controller, receiver, transceiver, transmitter, port, conductors, software, and/or hardware for communicating data.

The network(s) 1120 can be any type of network or combination of networks that allows for communication between devices. In some embodiments, the network(s) can include one or more of a local area network, wide area network, the Internet, secure network, cellular network, mesh network, peer-to-peer communication link, and/or some combination thereof, and can include any number of wired or wireless links. Communication over the network(s) 1120 can be accomplished, for instance, via a communication interface using any type of protocol, protection scheme, encoding, format, packaging, etc.

The remote computing system 1110 can include one or more remote computing devices that are remote from the vehicle computing system 102. The remote computing devices can include components (e.g., processor(s), memory, instructions, data) similar to that described herein for the computing device(s) 1101. Moreover, the remote computing system 1110 can be configured to perform one or more operations of the operations computing system 104, as described herein. Moreover, the computing systems of other vehicles described herein can include components similar to that of vehicle computing system 102.

Computing tasks discussed herein as being performed at computing device(s) remote from the vehicle can instead be performed at the vehicle (e.g., via the vehicle computing system), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for controlling an autonomous vehicle, the method comprising:
    obtaining, by a computing system comprising one or more computing devices, data representing a first trajectory of an autonomous vehicle that indicates a motion plan between an initial state of the autonomous vehicle and a final state of the autonomous vehicle, the first trajectory including one or more intermediate states corresponding to the motion plan, the initial state, the final state, and the one or more intermediate states comprising two or more vehicle state information parameters, the vehicle state information parameters comprising a position, a velocity, an acceleration, a jerk, a yaw, a swirl, or a juke, at least one of the two or more vehicle state information parameters of the initial state, the final state, and the one or more intermediate states comprising a jerk, a yaw, a swirl, or a juke;
    determining, by the computing system, a second trajectory based at least in part on the first trajectory, the second trajectory including the initial state of the first trajectory and one or more secondary states, the one or more secondary states each comprising a subset of the vehicle state information parameters of the initial state, the one or more secondary states indicating a change in one or more of the vehicle state information parameters relative to a preceding state;
    wherein determining the second trajectory comprises adjusting, by the computing system, a spatial resolution of the first trajectory from a first spatial resolution to a second spatial resolution, wherein the first trajectory indicates a state of the autonomous vehicle at the first spatial resolution, and the second trajectory indicates a state of the autonomous vehicle at the second spatial resolution that is less precise than the first spatial resolution;
    determining, by the computing system, one or more control signals based at least in part on the second trajectory, wherein the control signals cause the autonomous vehicle to execute at least part of the motion plan; and
    controlling a motion of the autonomous vehicle according to the motion plan, based at least in part on the one or more control signals.

2. The computer-implemented method of claim 1, wherein determining the one or more control signals comprises:
    encoding, by the computing system, the initial state in a first data structure that corresponds to the first trajectory;
    appending, by the computing system, the secondary states to the first data structure to generate a second data structure that corresponds to the second trajectory; and
    determining, by the computing system, the one or more control signals based at least in part on the second data structure.

3. A computing system for controlling an autonomous vehicle, the system comprising:
    one or more processors; and
    one or more tangible, non-transitory, computer readable media that collectively store instructions that when executed by the one or more processors cause the computing system to perform operations, the operations comprising:
        determining a first trajectory of an autonomous vehicle indicating a motion plan between an initial state and a final state of the autonomous vehicle, the first trajectory including one or more intermediate states corresponding to the motion plan, the initial state, final state, and one or more intermediate states comprising two or more vehicle state information parameters, the vehicle state information parameters comprising a position, a velocity, an acceleration, a jerk, a yaw, a swirl, or a juke, at least one of the two or more vehicle state information parameters of the initial state, the final state, and the one or more intermediate states comprising a jerk, a yaw, a swirl, or a juke;

determining a second trajectory based at least in part on the first trajectory, the second trajectory including the initial state of the first trajectory and one or more secondary states, the one or more secondary states each comprising a subset of the vehicle state information parameters of the initial state, the one or more secondary states indicating a change in one or more of the vehicle state information parameters relative to a preceding state;

wherein determining the second trajectory comprises adjusting a spatial resolution of the first trajectory from a first spatial resolution to a second spatial resolution, wherein the first trajectory indicates a state of the autonomous vehicle at the first spatial resolution, and the second trajectory indicates a state of the autonomous vehicle at the second spatial resolution that is less precise than the first spatial resolution;

determining one or more control signals based at least in part on the second trajectory, wherein the control signals cause the autonomous vehicle to execute at least part of the motion plan; and controlling a motion of the autonomous vehicle according to the motion plan, based at least in part on the one or more control signals.

4. The computing system of claim 3, wherein determining the one or more control signals comprises:

encoding the initial state in a first data structure that corresponds to the first trajectory;

appending the secondary states to the first data structure to generate a second data structure that corresponds to the second trajectory; and determining the one or more control signals based at least in part on the second data structure.

5. The computing system of claim 4, wherein determining the one or more control signals further comprises:

adjusting the spatial resolution of the one or more states represented by the second data structure to generate an adjusted second data structure; and determining the one or more control signals based at least in part on the adjusted second data structure.

* * * * *